United States Patent
Erhart et al.

(10) Patent No.: US 8,824,646 B2
(45) Date of Patent: Sep. 2, 2014

(54) METHOD AND APPARATUS FOR INTELLIGENT PROCESSING OF SUSPEND AND RESUME OPERATIONS IN A CALL CENTER

(75) Inventors: George W. Erhart, Loveland, CO (US); Valentine C. Matula, Granville, OH (US); David Skiba, Golden, CO (US)

(73) Assignee: Avaya Inc, Basking Ridge, NJ (US)

( * ) Notice: Subject to any disclaimer, the term of this patent is extended or adjusted under 35 U.S.C. 154(b) by 1959 days.

(21) Appl. No.: 11/961,586

(22) Filed: Dec. 20, 2007

(65) Prior Publication Data

US 2009/0161859 A1 Jun. 25, 2009

(51) Int. Cl.
*H04M 11/00* (2006.01)
*H04M 3/493* (2006.01)
*H04M 3/428* (2006.01)
*H04M 7/00* (2006.01)

(52) U.S. Cl.
CPC ............ *H04M 3/4938* (2013.01); *H04M 3/428* (2013.01); *H04M 7/006* (2013.01)
USPC ..................................... 379/88.18; 379/88.01

(58) Field of Classification Search
CPC ...................................................... H04M 3/493
USPC ............ 379/393, 265.01–266.1, 88.01, 88.18
See application file for complete search history.

(56) References Cited

U.S. PATENT DOCUMENTS

| | | | | |
|---|---|---|---|---|
| 7,260,530 | B2 * | 8/2007 | Werner | 704/251 |
| 2003/0152202 | A1 * | 8/2003 | Mumick et al. | 379/93.17 |
| 2006/0126803 | A1 * | 6/2006 | Patel et al. | 379/88.01 |
| 2006/0276196 | A1 * | 12/2006 | Jiang et al. | 455/446 |
| 2007/0130313 | A1 * | 6/2007 | King | 709/223 |

OTHER PUBLICATIONS

SIP WG Rosenberg et al., "A SIP Interface to VoiceXML Dialog Servers", Internet Engineering Task Force, Standard Working Draft, p. 1-16, Jul. 13, 2001, ISSN: 0000-0004.*
Rosenberg et al., "A Sip Interface to VoiceXML Dialog Servers; draft-rosenberg-sip-vxml-00.txt", "SIP WG Internet Draft XP015034720", Jul. 13, 2001, No. 0004, Publisher: Internet Engineering Task Force.
Burke et al., "SIP Interface to VoiceXML Media Services; draft-burke-vxml-03.txt", "Network Working Group Internet-Draft XP015057431", Jul. 9, 2007, No. 3, Publisher: The IETF Trust.
"Voice eXtensible Markup Language", "http://www.voicexml.org/specs/VoiceXML-100.pdf XP002521221", Mar. 7, 2000, Publisher: Voice XML Forum.
Agante Da Silva, P., "EP Application No. 08167771.8-2414 Extended European Search Report Apr. 9, 2009", , Publisher: EPO, Published in: EP.
Hyam, Kristy, "CA Application No. 2,641,498 Office Action Mar. 30, 2011", , Publisher: CIPO, Published in: CA.
"EP Application No. 08167771.8-2414 Examination Report Sep. 15, 2009", , Publisher: EPO, Published in: EP.

* cited by examiner

*Primary Examiner* — Alexander Jamal

(57) ABSTRACT

Methods and apparatus are provided for processing "on hold" commands in a call center. A communication dialog is processed by storing a checkpoint containing a context of the communication; monitoring the communication dialog for an "on-hold" condition; and suspending the communication dialog when the "on-hold" condition is detected The "on-hold" condition can be detected by monitoring telephony signaling. The communication dialog can optionally be returned to a restart point, such as a checkpoint, when the "on-hold" condition is detected. The communication dialog can be monitored for an "off-hold" condition and restarted from a checkpoint when the "off-hold" condition is detected. A resume context message can optionally be provided to the caller when the "off-hold" condition is detected.

17 Claims, 5 Drawing Sheets

METHOD AND APPARATUS FOR INTELLIGENT PROCESSING OF SUSPEND AND RESUME OPERATIONS IN A CALL CENTER

FIELD OF THE INVENTION

The present invention relates generally to call centers or other call processing systems, and more particularly, to methods and apparatus for processing an "on hold" feature in a call center.

BACKGROUND OF THE INVENTION

Many companies employ contact centers, such as call centers, to provide an interface for exchanging information with customers. In many call center environments, a customer service representative initially queries a caller for information, such as an account number, credit card number, or the nature of the inquiry. The customer service representative may be a real person or a virtual agent that typically routes the call to the appropriate destination after collecting initial information.

For example, many call centers employ interactive voice response (IVR) systems, such as the CONVERSANT® System for Interactive Voice Response, commercially available from Avaya Inc., that provide callers with information in the form of recorded messages and to obtain information from callers using keypad or voice responses to recorded queries Ports on the IVR systems are often referred to as "automated agents" or "virtual agents." Typically, a media server receives a call, obtains the appropriate Voice eXtensible Markup Language (VoiceXML) page (i.e, a script for the call) from a server and then executes the VoiceXML page for the caller.

Increasingly, customers are choosing alternate forms of contact into a business, such as a web-based contact over the Internet or another Internet Protocol (IP) network. For example, many customers call a contact center over the Internet using Voice Over IP (VoIP) communications. The form of contact selected by a customer, however, may impact the functionality that is available to the customer or the manner in which the communication is processed by the call center. A caller can place their telephone on hold while interacting with a voice dialog on an IVR system. With a traditional Plain Old Telephone Systems (POTS) type connection, for example, the telephone of the far end party does not receive any specific signaling when the near end party places the call on hold. Thus, when the far end is an IVR systems the IVR system has no way to know that the call has been placed on hold. Thus, following an "on hold" condition, the IVR system will continue processing the call as if the caller were still actively participating. The dialog may fail because the caller stops providing input and eventually the dialog could time-out or otherwise hang up. In addition, even if the caller returns to the IVR system prior to the call being dropped, the caller may not know what state the dialog is in because the caller has not heard the prompt and may not be able to continue.

VoIP protocols have changed the manner in which an "on hold" condition is processed. For VoIP protocols, such as the Session Initiation Protocol (SIP), the "on-hold" function can result in a renegotiation of the media for the call Typically, the party placing the call "on-hold" will re-INVITE the far end party with a session description protocol that disables the media streams. Optionally, the party placing the call "on-hold" could renegotiate a stream to a Real Time Streaming Protocol (RTSP) server that will play music-on-hold to the far end party. In any event, the far end party receives a positive indication of the call being placed "on-hold"

A need therefore exists for improved methods and apparatus for processing "on hold" commands in a call center.

SUMMARY OF THE INVENTION

Generally, methods and apparatus are provided for processing "on hold" commands in a call center According to one aspect of the invention, a communication dialog based on a predefined script is processed by storing a checkpoint containing a context of the communication; monitoring the communication dialog for an "on-hold" condition; and suspending the communication dialog when the "on-hold" condition is detected The "on-hold" condition can be detected by monitoring telephony signaling. The communication dialog can optionally be returned to a restart point when the "on-hold" condition is detected. The restart point may be, for example, a previous checkpoint.

Thereafter, the communication dialog can be monitored for an "off-hold" condition. The communication dialog can optionally be returned to a restart point when the "off-hold" condition is detected. The checkpoint can optionally be restored when the "off-hold" condition is detected In one variation, a resume context message is provided to the caller when the "off-hold" condition is detected.

A more complete understanding of the present invention, as well as further features and advantages of the present invention, will be obtained by reference to the following detailed description and drawings.

DETAILED DESCRIPTION

Figure 1:
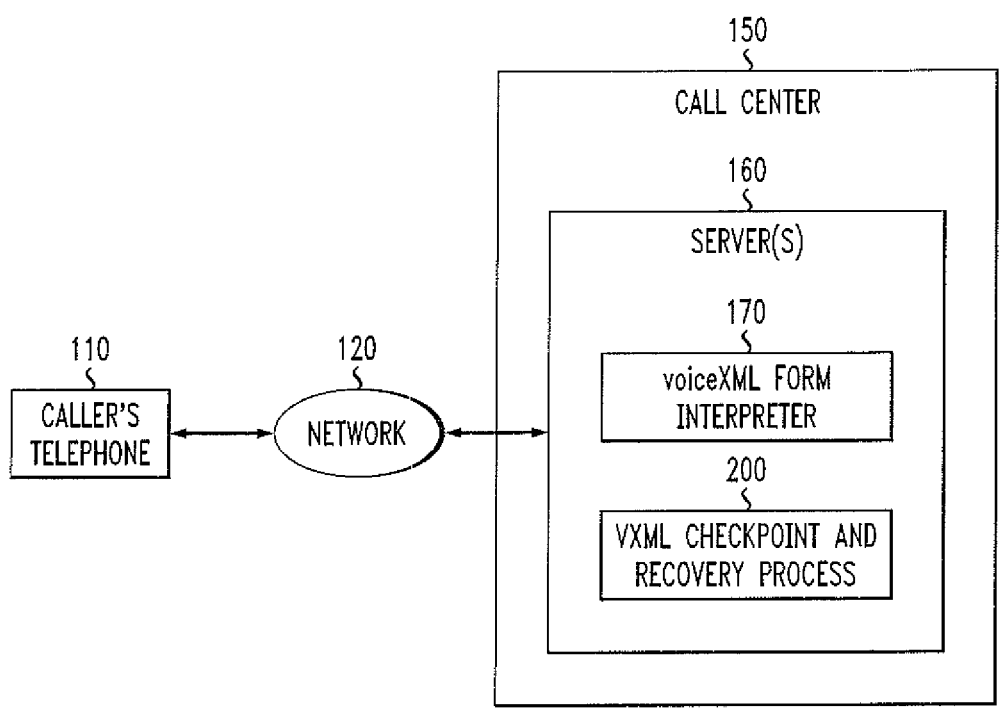
FIG. 1 illustrates a network environment in which the present invention can operate.

FIG. 1 illustrates a network environment in which the present invention can operate. As shown in FIG. 1, a caller, employing a telephone 110, places a telephone call to a call center 150 and is connected to a call center agent (not shown). The telephone 110 may be embodied as any device capable of establishing a voice connection over a network 120, such as a conventional, cellular or IP telephone. The network 120 may be embodied as any private or public wired or wireless network, including the Public Switched Telephone Network, Private Branch Exchange switch, Internet, or cellular network, or some combination of the foregoing As shown in FIG. 1, and discussed further below, the exemplary call center 150 includes one or more servers 160. The exemplary server 160 includes a VoiceXML Form Interpreter 170 and a VoiceXML Checkpoint and Recovery Process 300, discussed further below in conjunction with FIG. 3. It is noted that in an alternate implementation, the VoiceXML Form Interpreter 170 and a VoiceXML Checkpoint and Recovery Process 300 could be stored on a distributed agent workstation. Generally, the VoiceXML Form Interpreter 170 is an algorithm defined in Appendix C of the VXML 2.0 Specification. The form interpreter 170 defines how the interpreter should process a VXML file. As discussed hereinafter, the form interpreter 170 is typically divided into four phases, namely, (i) an initialization phase that loads the form and defined variables; (ii) a selection phase that selects the first eligible form item for execution; (iii) a collection phase that plays the prompts, as needed, and collects input from the caller; and (iv) a process phase that processes the result and executes any <filled> blocks. After the process phase, execution returns to the selection phase. If no form item is eligible to be visited, then the application is terminated.

As indicated above, under a VoIP protocol, the far end party, such as the call center 150 of FIG. 1, receives a positive indication of the call being placed "on-hold" by the near end caller 110. According to one aspect of the present invention, an "on-hold" condition is detected, which triggers a suspension of the IVR dialog and a roll back to an appropriate restart point (e.g., a previous checkpoint). When the caller 110 takes the call off hold, the dialog would resume at the restart point. In one exemplary implementation, the voice dialog engine (such as VXML in the exemplary embodiment) is extended to "checkpoint" restart locations. The dialog state can be saved, for example, at the beginning of the execution of each "form item" in VXML The specific spot saved for roll-back will be dependent on the voice dialog language being used. The "on-hold" condition can be detected, for example, by examining the signaling. Upon detecting an "on-hold" condition, the disclosed method suspends the execution of the voice dialog on the IVR 150. For VXML based dialogs, if currently in a form item, then the method will roll back to the beginning of that item (as previously saved). If outside of a form item, execution continues until the next form item is reached, and then the method waits. When the off-hold condition is detected, the voice dialog resumes at the point of the start of the form item.

Figure 2:
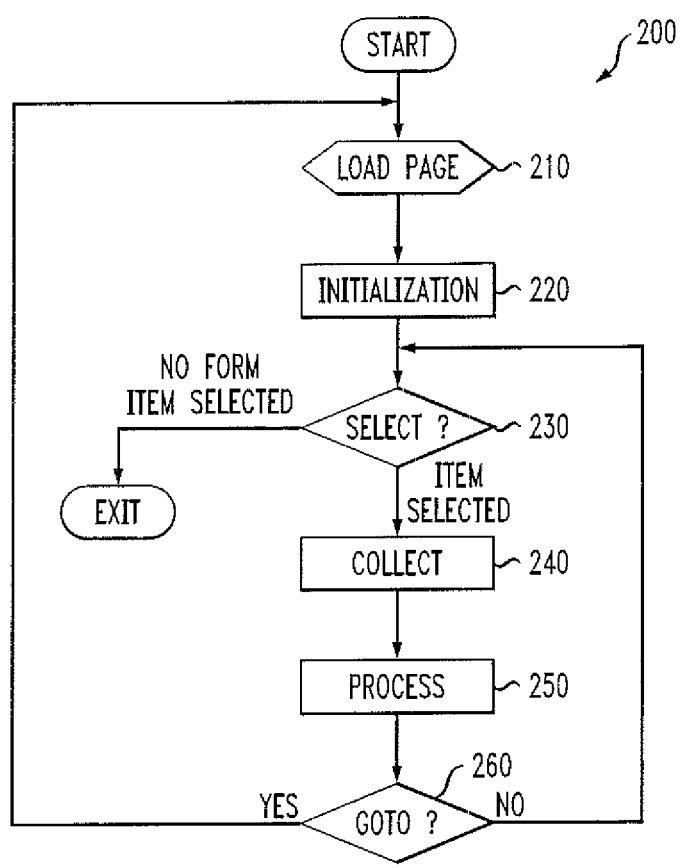
FIG. 2 is a flow chart of a conventional form interpretation process.

FIG. 2 is a flow chart of a conventional form interpretation process 200. As shown in FIG. 2, the form interpretation process 200 initially loads a page during step 210. The page is initialized during step 220, whereby the page is read and any variables on the page are initialized. During step 230, the first item on the page is selected. If there are no further selectable items, then program control terminates. Otherwise, any prompts associated with the item are played during step 240 and any user input is collected. The collected input is processed during step 250 and the page is updated accordingly.

A test is performed during step 260 to determine if there are any other items to process on the current page. If it is determined during step 260 that there are additional items to process on the current page, then program control returns to step 230. If, however, it is determined during step 260 that there are no additional items to process on the current page, then program control returns to step 210 to load a new page.

Automatic Checkpoint and Recovery

Figure 3:
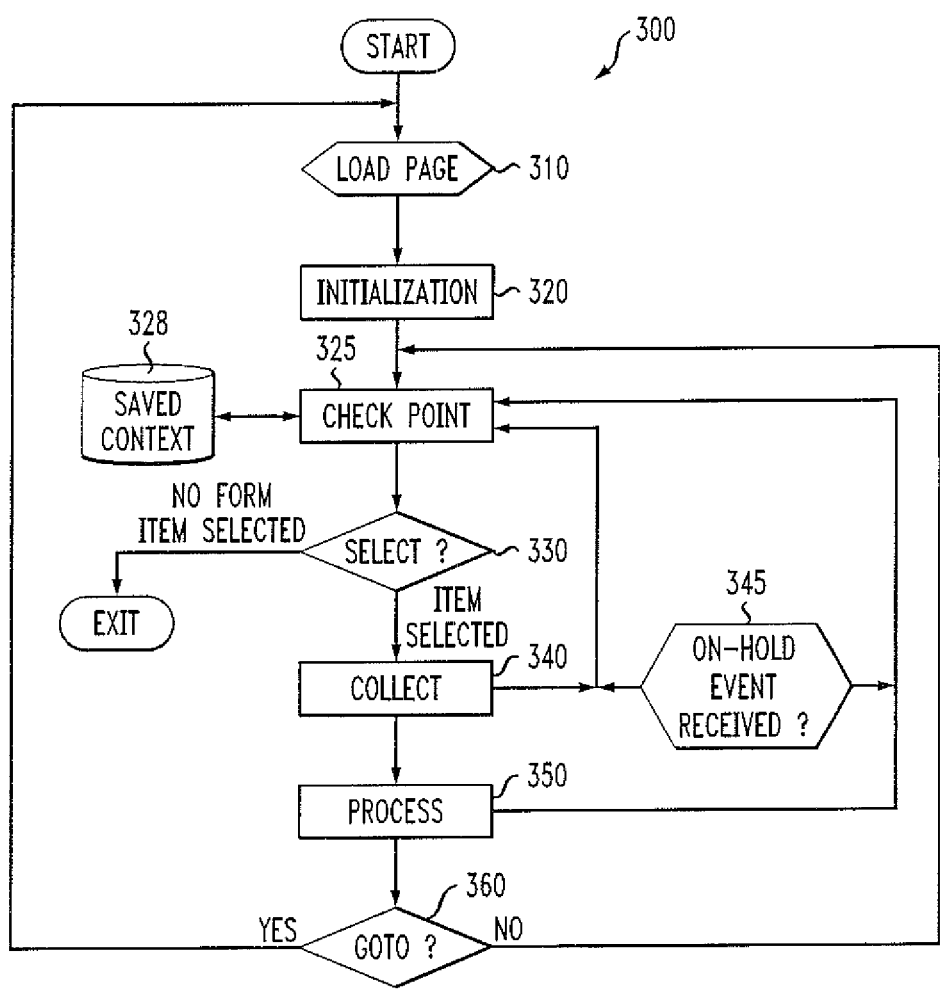
FIG. 3 is a flow chart of a form interpretation process that incorporates automatic checkpoint and recovery in accordance with the present invention.

FIG. 3 is a flow chart of a form interpretation process 300 that incorporates automatic checkpoint and recovery in accordance with the present invention In the implementation shown in FIG. 3, the form interpreter 300 automatically performs the check pointing, without any input from the VXML programmer. As shown in FIG. 3, the form interpretation process 300 initially loads a page during step 310. The page is initialized during step 320, whereby the page is read and any variables on the page are initialized.

A checkpoint is performed during step 325 to save the context to a local or remote database 328. In one exemplary embodiment, the checkpoint saves the ECMAscript context (generally, all variables and values) See, for example, Standard ECMA-262, ECMAScript Language Specification, 3rd edition (December 1999), http://www.ecma-international.org/publications/standards/Ecma-262 htm, incorporated by reference herein.

During step 330, the first item on the page is selected. If there are no further selectable items, then program control terminates. Otherwise, any prompts associated with the item are played during step 340 and any user input is collected. The collected input is processed during step 350 and the page is updated accordingly In one exemplary embodiment, a test is performed during step 345 to determine if an on-hold event is detected (such as a SIP suspend command). The test during step 345 can be performed continuously, periodically or at other intervals. If it is determined during step 345 that an on-hold event is detected, then the process 300 returns to the checkpoint 325 Thus, if the "on-hold" event is signaled by the telephony interface, then execution is stopped and the interpreter returns to the check point 325 prior to the selection phase 330. The interpreter 300 waits for the "off-hold" signal from the telephony layer (such as a SIP resume command), then the "saved" ECMAscript context is restored from the database 328. Lastly, the interpreter 300 can restart the execution with the select phase 330. It is noted that the previously saved ECMAscript context remains saved until the next time the interpreter 300 performs a checkpoint 325 at the top of the loop.

A test is performed during step 360 to determine if there are any other items to process on the current page. If it is determined during step 360 that there are additional items to process on the current page, then program control returns to step 325. If however, it is determined during step 360 that there are no additional items to process on the current page, then program control returns to step 310 to load a new page.

An application programmer can optionally set a system level property (resumeaudio) to provide a prompt that would be played back when the "off-hold" event has been received. This would be similar to the existing fetchaudio property. The interpreter 300 would play this prompt prior to re-entering the select phase 330 The intention is that the application programmer would provide a prompt that would remind the caller of what they were doing prior to putting the IVR system on-hold Programmatic Checkpoint and Recovery In a further variation of the present invention, the VXML application programmer can set specific check points via a language that would force the VXML interpreter to save the application context. According to another aspect of the present invention, the form interpreter is extended to recognize a new VXML language construct <checkpoint>. As discussed hereinafter, the <checkpoint> element would allow for child <prompt> elements that could be used to play a "resuming your dialog session" type prompt to the callers when the "off-hold" event is received.

Figure 4:
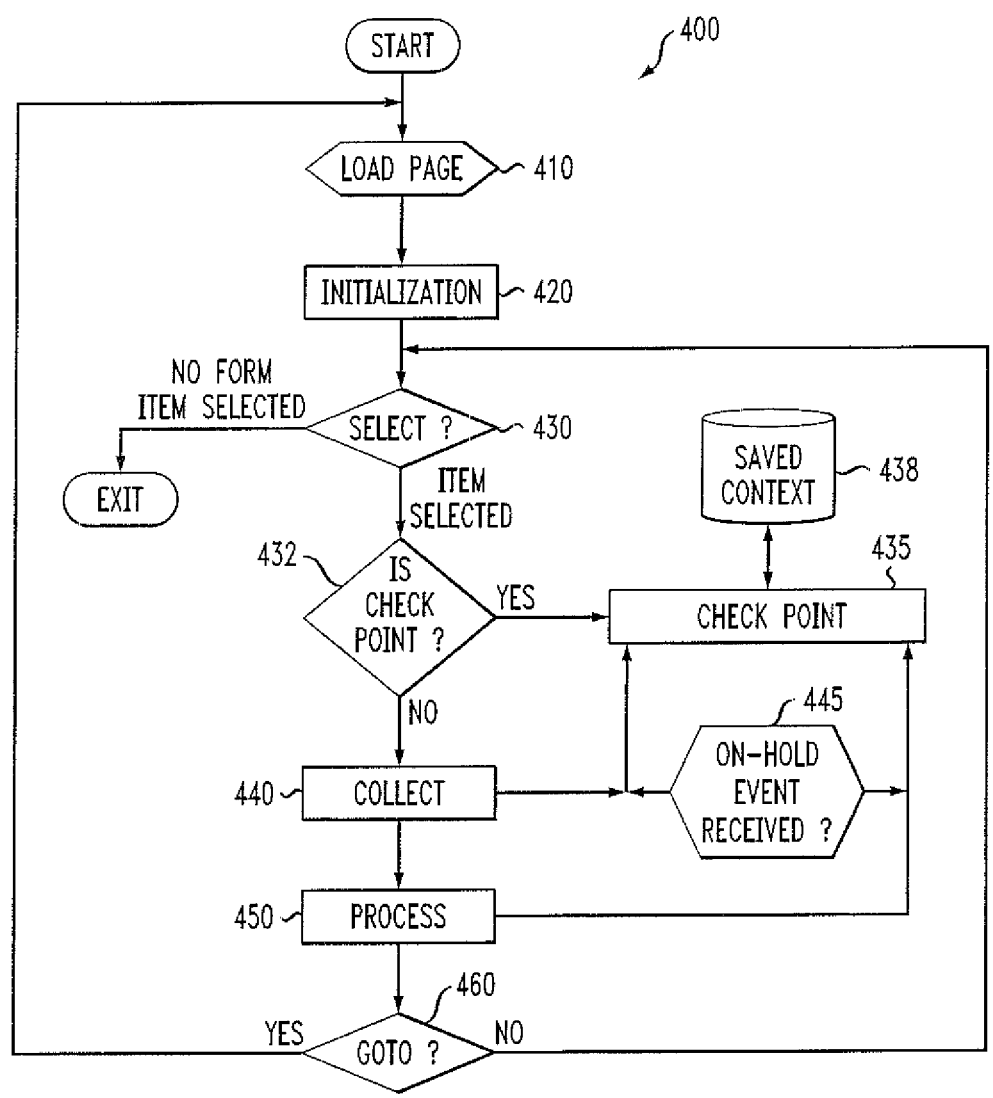
FIG. 4 is a flow chart of a form interpretation process that incorporates programmatic checkpoint and recovery in accordance with the present invention.

FIG. 4 is a flow chart of a form interpretation process 400 that incorporates programmatic checkpoint and recovery in accordance with the present invention In the implementation shown in FIG. 4, the form interpreter 400 performs check pointing, as specified by the VXML programmer. As shown in FIG. 4, the form interpretation process 400 initially loads a page during step 410 The page is initialized during step 420, whereby the page is read and any variables on the page are initialized.

During step 430, the first item on the page is selected If there are no further selectable items, then program control terminates. Otherwise, a test is performed during step 432 to determine if the selected item indicates that a checkpoint should be performed.

If it is determined during step 432 that the selected item indicates that a checkpoint should be performed, then a checkpoint is performed during step 435 to save the context to a database 438. If, however, it is determined during step 432 that the selected item does not indicate that a checkpoint should be performed then program control proceeds to step 440 where any prompts associated with the selected item are played and any user input is collected. The collected input is processed during step 450 and the page is updated accordingly.

In one exemplary embodiment, a test is performed during step 445 to determine if an on-hold event is detected. The test during step 445 can be performed continuously, periodically or at other intervals. If it is determined during step 445 that an on-hold event is detected, then the process 400 returns to the checkpoint 435. The interpreter 400 waits for the "off-hold" signal from the telephony layer, then the "saved" ECMAscript context is restored from the database 438 Lastly, the interpreter 400 can restart the execution with the select phase 430. It is noted that the previously saved ECMAscript context remains saved until the next time the interpreter 400 performs a checkpoint 435

A test is performed during step 460 to determine if there are any other items to process on the current page. If it is determined during step 460 that there are additional items to process on the current page, then program control returns to step 430. If, however, it is determined during step 460 that there are no additional items to process on the current page, then program control returns to step 410 to load a new page.

Checkpoint Semantics

The <checkpoint> element can be at the document or form level. When at the document level, a checkpoint is created prior any processing of the VXML document (e.g., prior to the initialization phase.) If at the <form> level, the checkpoint is created at the point it is selected as part of the selection phase of the form interpreter. Form level checkpoints selected by the form interpreter are marked as visited All <checkpoint> elements save the ECMAscript context at the point they are executed. After the context has been saved, the form interpreter jumps back to the Select phase.

In an exemplary implementation, the check point is only the most recently saved context. There might be situations where (in the programmatic case), it might be useful to "name" the check points and have the ability to resume at a specific named check point. One possibility is a duration factor. So, suppose a person left the IVR on hold for 30 seconds, the most likely choice would be to resume at the most recent check point because the caller should still have the context of the dialog in their head. If on the other hand, the IVR was on hold for several minutes, then it might be useful to back up farther in the dialog to allow the caller to re-establish an understanding of the context of the dialog.

Figure 5:
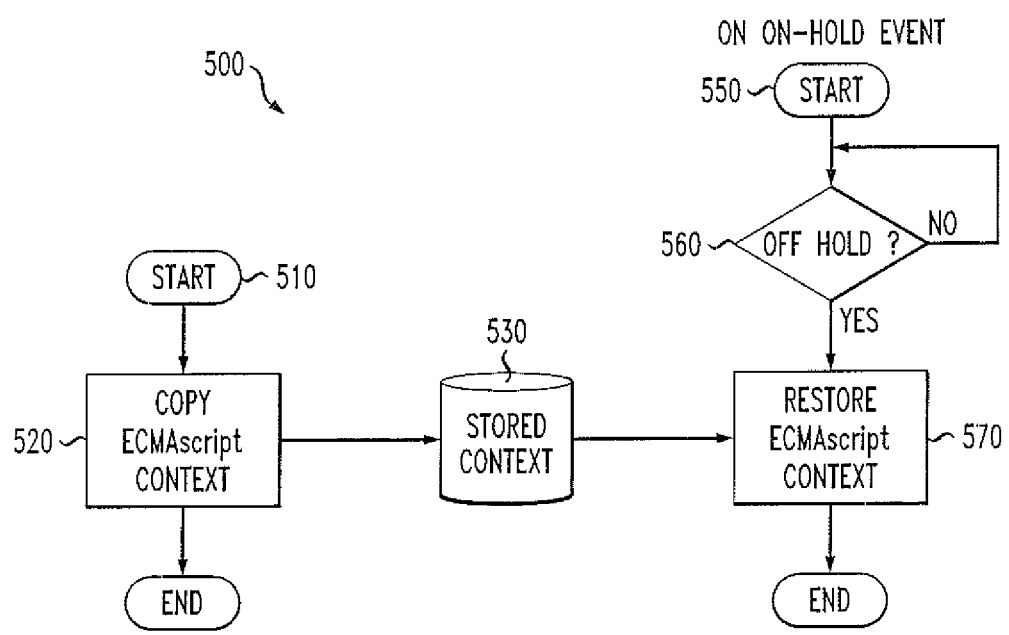
FIG. 5 illustrates a functional view of a checkpoint process incorporating features of the present invention.

FIG. 5 illustrates a functional view of a checkpoint process 500 in accordance with the present invention. As shown in FIG. 5, if the checkpoint process 500 is entered at step 510 to save the context, the checkpoint process 500 will copy the ECMAScript context during step 520 to a context database 530 and then exit. If, however, the checkpoint process 500 is entered at step 550 from an on-hold event, a test is performed during step 560 to determine if an off-hold event is detected. Once it is determined during step 560 that an off-hold event is detected, then program control proceeds to step 570 to restore the ECMAscript context from the database 530 before exiting.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some or the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention. For example, in a POTS implementation, an on-hold condition can be detected indirectly by detecting "music-on-hold," using a known technique.

We claim:

1. A method for processing a communication dialog based on a predefined script, comprising:
    independent of whether an on-hold condition is received, storing a checkpoint, wherein said process of storing the checkpoint comprises saving a context of said communication and said process of storing the checkpoint is performed automatically by a form interpreter;
    monitoring said communication dialog for an "on-hold" condition; and
    suspending said communication dialog when said "on-hold" condition is detected.

2. The method of claim 1, further comprising the step of returning said communication dialog to a restart point when said "on-hold" condition is detected.

3. The method of claim 2, wherein said restart point is a previous checkpoint.

4. The method of claim 1, further comprising the step of monitoring said communication dialog for an off-hold" condition.

5. The method of claim 4, further comprising the step of returning said communication dialog to a restart point when said "off-hold" condition is detected.

6. The method of claim 5, further comprising the step of restoring said checkpoint when said "off-hold" condition is detected.

7. The method of claim 4, further comprising the step of providing a resume context message when said "off-hold" condition is detected.

8. The method of claim 1, wherein said step of detecting an "on-hold" condition further comprises the step of monitoring telephony signaling.

9. An apparatus for processing a communication dialog based on a predefined script, comprising:
a memory; and
at least one processor, coupled to the memory, operative to:
independent of whether an on-hold condition is received, store a checkpoint, wherein said checkpoint comprises a context of said communication and wherein said checkpoint is stored automatically by a form interpreter;
monitor said communication dialog for an "on-hold" condition; and
suspend said communication dialog when said "on-hold" condition is detected.

10. The apparatus of claim 9, wherein said processor is further configured to return said communication dialog to a restart point when said "on-hold" condition is detected.

11. The apparatus of claim 10, wherein said restart point is a previous checkpoint.

12. The apparatus of claim 9, wherein said processor is further configured to monitor said communication dialog for an "off-hold" condition.

13. The apparatus of claim 12, wherein said processor is further configured to return said communication dialog to a restart point when said "off-hold" condition is detected.

14. The apparatus of claim 13, wherein said processor is further configured to restore said checkpoint when said "off-hold" condition is detected.

15. The apparatus of claim 12, wherein said processor is further configured to provide a resume context message when said "off-hold" condition is detected.

16. The apparatus of claim 9, wherein said "on-hold" condition is detected by monitoring telephony signaling.

17. An article of manufacture for processing a communication dialog based on a predefined script, comprising a machine readable medium containing one or more programs which when executed implement the steps of:
independent of whether an on-hold condition is received, storing a checkpoint, wherein said checkpoint comprises a context of said communication and wherein said checkpoint is stored automatically by a form interpreter;
monitoring said communication dialog for an "on-hold" condition; and
suspending said communication dialog when said "on-hold" condition is detected.

* * * * *